United States Patent [19]

Craver

[11] Patent Number: 4,505,970
[45] Date of Patent: Mar. 19, 1985

[54] MULTILAYER FILMS COMPRISING MIXTURES OF A MELT INDEX AND 2 MELT INDEX LINEAR LOW DENSITY POLYETHYLENE

[75] Inventor: Joseph N. Craver, Flossmoor, Ill.

[73] Assignee: Union Carbide Corporation, Danbury, Conn.

[21] Appl. No.: 428,993

[22] Filed: Sep. 30, 1982

[51] Int. Cl.$^3$ ............................................. B32B 7/02
[52] U.S. Cl. ..................................... 428/213; 428/35; 428/218; 428/349; 428/516
[58] Field of Search ................ 428/212, 35, 516, 515, 428/213, 349

[56] References Cited

U.S. PATENT DOCUMENTS

| | | | |
|---|---|---|---|
| 3,281,501 | 10/1966 | Coats et al. | 260/897 |
| 3,694,524 | 9/1972 | Colombe et al. | 264/209 |
| 4,000,234 | 12/1976 | Pilgrim et al. | 264/95 |
| 4,076,698 | 2/1978 | Anderson | 526/348.6 |
| 4,339,502 | 7/1982 | Luebbe, Jr. et al. | 428/522 |
| 4,359,561 | 10/1982 | Anthony | 428/35 |

Primary Examiner—George F. Lesmes
Assistant Examiner—E. Rollins Buffalow
Attorney, Agent, or Firm—John C. LeFever; Real J. Grandmaison

[57] ABSTRACT

A multilayer film suitable for use in the manufacture of garbage and trash bags wherein the first outer layer comprises a blend of a low pressure, low density polyethylene having a melt index of about 1 decigram per minute and a low pressure, low density polyethylene having a melt index of about 2 decigrams per minute. The second outer layer is made with a high pressure, low density polyethylene.

13 Claims, No Drawings

MULTILAYER FILMS COMPRISING MIXTURES OF A MELT INDEX AND 2 MELT INDEX LINEAR LOW DENSITY POLYETHYLENE

This invention relates to a plastic film, and more particularly, to a multilayer plastic film suitable for use in the manufacture of garbage and trash bags.

In general, plastic garbage and trash bags for bulk waste material may be produced in film form from various polymers such as polyethylene. The films used for such bags should desirably possess high strength characteristics such as puncture toughness and tensile strength. Another desirable property of plastic bags is low manufacturing cost. It will be recognized that the required quantity of raw material may be reduced by use of polyethylene film having the previously mentioned high strength characteristics, and in part for this reason, multiple layer plastic films have been used to manufacture garbage bags.

With the introduction of linear low density polyethylenes made by the low pressure processes, attempts have been made to substitute this material for film applications in place of conventional highly branched low density polyethylenes made by high pressure processes. The reason for these efforts is that low pressure, low density polyethylene is widely recognized as being tougher and stronger than high pressure, low density polyethylene.

The prior art polyethylene film-type bags have thus been characterized by either limited strength properties with relatively low extruder power requirement and low extruder head pressure on one hand, or characterized by high strength properties and relatively high extruder power requirement and high extruder head pressure on the other hand.

In addition, polyethylene film for the production of consumer garbage and trash bags is generally prepared in the thickness range of between about 1.2 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for strong films for this application which will be resistant to damage by puncture or yielding under stress. A strong film is not only desirable from the standpoint that the finished bag is more serviceable in the end-use, but also in that a thin film can be used and still meet the necessary strength requirements, thus providing a better cost-performance relationship for the consumer.

It is also desirable to obtain a thin bag that will function as a trash and garbage container at a performance level generally requiring a thick bag, to enable the manufacturer to produce the bag at a higher rate such that increased linear feet per unit of time results in lower cost, and less resin is required per bag. Previous attempts employing linear low density polyethylene copolymers produced by the low pressure polymerization process to obtain the aforementioned benefits, have been restricted due to their lower extensional viscosity, i.e., melt strength, after leaving the extrusion die, and the bubble stability of the blown film is lower than with high pressure, low density polyethylene. As a result, the ability to air cool the extrudate of low pressure, low density polyethylene is lessened and, consequently, the output in pounds per hour is lower.

In accordance with this invention there is provided a multilayer polyethylene film possessing satisfactory puncture toughness and tensile strength which may be produced at rates significantly greater than those previously possible.

The multilayer film of this invention is eminently suitable for use in the manufacture of garbage and trash bags which, in one embodiment, comprises a first outer layer of a blend of a low pressure, low density polyethylene having a melt index of about 1 decigram per minute and a low pressure, low density polyethylene having a melt index of about 2 decigrams per minute; and a second outer layer comprising a high pressure, low density polyethylene containing up to about 30 percent by weight of a low pressure, low density polyethylene, based on the weight of the second outer layer.

In another embodiment of this invention, the multilayer film composition comprises a first outer layer of a blend of a low pressure, low density polyethylene having a melt index of about 1 decigram per minute and a low pressure, low density polyethylene having a melt index of about 2 decigrams per minute; one or more core layers wherein at least one core layer comprises a low pressure, low density polyethylene; and a second outer layer comprising a high pressure, low density polyethylene containing up to about 50 percent by weight of a low pressure, low density polyethylene, based on the weight of the second outer layer.

In a further embodiment of this invention, the multilayer film composition comprises a first outer layer of a blend of a low pressure, low density polyethylene having a melt index of about 1 decigram per minute and a low pressure, low density polyethylene having a melt index of about 2 decigrams per minute; one or more core layers wherein at least one core layer comprises a blend of a low pressure, low density polyethylene having a melt index of about 1 decigram per minute and a low pressure, low density polyethylene having a melt index of about 2 decigrams per minute; and a second outer layer comprising a high pressure, low density polyethylene containing up to about 30 percent by weight of a low pressure, low density polyethylene, based on the weight of the second outer layer.

The low pressure, low density polyethylene comprising one or more layers of the multilayer film of this invention comprises copolymers formed from ethylene and a comonomer selected from butene-1, pentene-1, hexene-1, heptene-1 and octene-1, and mixtures thereof. These copolymers generally have a melt index of between about 0.5 and about 3.0 decigrams per minute. It had previously been preferred that the copolymers have a melt index of between about 0.6 and about 1.2 decigrams per minute because as the melt index decreases, viscosity increases and extrusion becomes more difficult, thereby requiring more powerful extruders. However, it has now surprisingly been found that the presence of particular amounts of the higher melt index copolymer in the low pressure, low density polyethylene layer composition of this invention enables production rates which are significantly greater than those achieved when the composition contains only copolymers having a low melt index.

Therefore, in accordance with this invention, improved production rates may be obtained when the low pressure, low density polyethylene layer or layers comprises a blend containing about 80 percent by weight of a low pressure, low density polyethylene having a melt index of about 1 decigram per minute and about 20 percent by weight of a low pressure, low density polyethylene having a melt index of about 2 decigrams per minute. Even better production rates are obtained when the low pressure, low density polyethylene layer or layers comprises a blend containing about 60 percent by weight of a low pressure, low density polyethylene having a melt index of about 1 decigram per minute and about 40 percent by weight of a low pressure, low density polyethylene having a melt index of about 2 decigrams per minute. Maximum production rates are obtained when the low pressure, low density polyethylene layer or layers comprises a blend containing about 40 percent by weight of a low pressure, low density polyethylene having a melt index of about 1 decigram per minute and about 60 percent by weight of a low pressure, low density polyethylene having a melt index of about 2 decigrams per minute and both low pressure, low density polyethylenes have a density of between about 0.916 and about 0.930 grams per cubic centimeter.

It has been found that as the density increases, machine direction tear strength is found to lessen. Thus, it is preferred that the copolymers have a density of between about 0.916 and about 0.920. Likewise, it is preferred that the low pressure, low density polyethylene comprise a copolymer of ethylene and butene-1.

The high pressure, low density polyethylene employed in this invention may have a melt index of between about 0.5 and about 5.0 decigrams per minute, and a density of between about 0.916 and about 0.930 grams per cubic centimeter. However, it is preferred that the high pressure, low density polyethylene have a melt index of between about 1 to 3 decigrams per minute and a density of between about 0.916 and about 0.924 grams per cubic centimeter.

In addition to the improved production rates of the multilayer film of this invention being predicated on the melt index of the low pressure, low density polyethylene copolymers employed herein, the thickness ratio of low pressure, low density polyethylene layer or layers to high pressure, low density polyethylene layer or layers is also a contributing factor. More specifically, by decreasing the thickness ratio of the low pressure, low density polyethylene layer with a corresponding increase of high pressure, low density polyethylene layer, it is found that melt strength and bubble stability of the extrudate are increased. Therefore, in order to maintain high production rates and retain desired physical properties in the final product, a preferred layer:layer thickness ratio of about 1.5:1 for the low pressure, low density polyethylene and the high pressure, low density polyethylene, respectively, should be employed. However, the layer:layer thickness ratio for the first outer layer to the second outer layer may be between 2:1 and 1:1.

Further, the multilayer film composition of this invention may comprise a first outer layer of the aforementioned low pressure, low density polyethylene blends containing a colorant selected from a pigment or dye, such as green or black; one or more core layers comprising low pressure, low density polyethylene copolymers; and a second outer layer comprising high pressure, low density polyethylene or a blend of said high pressure, low density polyethylene and said low pressure, low density polyethylene copolymers to which a colorant has been added. When so constructed, it is preferred that said first outer layer and core layer comprise between about 35 percent and about 60 percent of the total thickness of the multilayer film, and said second outer layer comprise the remaining thickness of the total thickness of the multilayer film.

Further, the multilayer film composition of this invention may comprise a first outer layer of the aforementioned low pressure, low density polyethylene blends containing up to about three percent by weight of high pressure, low density polyethylene and a colorant, and a second outer layer comprising high pressure, low density polyethylene containing up to about sixty percent by weight of low pressure, low density polyethylene and a colorant which may be different from that employed in the first outer layer.

The multilayer film composition of this invention is preferably prepared by simultaneously coextruding one or more layers of the aforementioned low pressure, low density polyethylene blends and one or more layers of high pressure, low density polyethylene. Coextrusion of the multilayer film composition has been found to result in substantial reduction of melt fracture events due to the blends of the low pressure, low density polyethylene employed herein, and thus allows higher output rates.

In addition, extrusion through narrow die gaps on the order of 30 to 50 mils provides multilayer films having more balanced physical properties. More specifically, the machine direction properties of the films are not vastly different from the transverse direction properties of the films. This is particularly important in garbage and trash bag production where each bag is generally side-sealed such that the bottom of the bag is the side fold of the blown film tubing. In this event, the transverse direction of the blown film becomes the lift direction of the bag.

The total thickness of the multilayer film may be generally between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash-garbage bag usage. A further disadvantage of thicker films is the difficulty in handling and tying the bag open end. A preferred balance of these opposing considerations is a film between about 1.0 and 1.8 mils thick.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed at a film manufacturing plant by co-extrusion of the film layers through a tubular die. Further, the multilayer film examples represented in Table 1 had the following material compositions. The 1 and 2 melt index materials were low pressure, low density polyethylene comprising a copolymer of ethylene and butene-1 having a density of about 0.919 and about 0.918 grams per cubic centimeter, respectively. The high pressure, low density polyethylene had a melt index of about 2 decigrams per minute and a density of about 0.918 grams per cubic centimeter. The thickness ratio of the low pressure, low density polyethylene layer to that of the high pressure, low density polyethylene was between 2:1 and 1.5:1. The low pressure, low density polyethylene layer was supplied by a 6 inch single screw extruder at a screw speed of between about 50 and 55 r.p.m. at a head pressure of about 7500 p.s.i. The high pressure, low density polyethylene layer was supplied by a 4½ inch single screw machine at a screw speed of between about 90 and 100 r.p.m. at a head pressure of about 6000 p.s.i. The apparatus useful in forming the multilayer films of this invention is more fully disclosed in U.S. Pat. No. 4,348,349 issued Sept. 7, 1982. The discharge from the die was blown into a multilayer film.

Production-scale experiments were run to evaluate the effects of using various blends of low pressure, low density polyethylene having a melt index of 1 decigram per minute, and 2 decigrams per minute, respectively. Each formulation was run at an initial speed of 190 feet per minute corresponding to a production rate of 1500 pounds per hour while producing 1.5 mil film. The line speed and screw speeds were then raised in about 6% increments and time was allowed for conditions to stabilize. This process was repeated until the highest stable production rate was established. The results are summarized in Table 1.

TABLE 1

| Example | % 1 Melt Index LPLDPE | % 2 Melt Index LPLDPE | Extruder Temperature | Thickness Ratio | Speed/Rate lb./hr. |
|---|---|---|---|---|---|
| 1 | 100 | 0 | 350° F. | 2.0 | 1616 |
| 2 | 0 | 100 | 350° F. | 2.0 | 1554 |
| 3 | 80 | 20 | 330° F. | 1.5 | 1640 |
| 4 | 80 | 20 | 330° F. | 2.0 | 1640 |
| 5 | 80 | 20 | 350° F. | 2.0 | 1640 |
| 6 | 80 | 20 | 350° F. | 1.5 | 1648 |
| 7 | 40 | 60 | 350° F. | 2.0 | 1640 |
| 8 | 40 | 60 | 350° F. | 1.5 | 1702 |
| 9 | 60 | 40 | 340° F. | 1.75 | 1640 |
| 10 | 40 | 60 | 330° F. | 2.0 | 1655 |
| 11 | 40 | 60 | 330° F. | 1.5 | 1710 |

LPLDPE means low pressure, low density polyethylene.

From the above tabular results, it can be seen that the maximum stable production rate was obtained by increasing the quantity of low pressure, low density polyethylene having a melt index of 2 decigrams per minute to about 60 percent by weight in the blend formulation. In addition, decreasing the thickness ratio of the layer of low pressure, low density polyethylene to the layer of the high pressure, low density polyethylene from 2.0:1 to 1.5:1 improved the maximum feasible production rate. The optimum combination of 60% by weight of 2 melt index polyethylene and 40% by weight of 1 melt index polyethylene, and a 1.5:1 layer thickness ratio of low density, low pressure polyethylene to high pressure, low density polyethylene provided a maximum production line speed of about 1700 pounds per hour. In addition, the 2 melt index and 1 melt index blends provided a more stable bubble and higher maximum feasible production rates than were possible when the product contained only 1 melt index low pressure, low density polyethylene. It is also noteworthy that the formula containing only 2 melt index low pressure, low density polyethylene (Example 2) gave very poor bubble stability and its maximum production rate could not exceed 1554 pounds per hour.

The multilayer film compositions of this invention are particularly desirable in order to gain freedom from melt fracture of the layer of low pressure, low density polyethylene at high output rates, and in order to aid in increasing the melt strength of the extrudate in order to improve bubble or melt cooling at higher output rates. It has been found that the multilayer film of this invention has physical properties, such as puncture toughness and tensile strength which are substantially improved over those of conventional multilayer films made from high pressure, low density polyethylene in all layers thereof or from blends of high pressure, low density polyethylene and low pressure, low density polyethylene.

The physical properties of the film composition shown in Table 1 are summarized in Table 2 wherein the following test criteria were used:

Tensile strength was measured by ASTM D882 method A.

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture of the film specimen is recorded in pounds and the energy to puncture is the integrated area under the load-penetration curve and is recorded in inch-pounds (inch-lbs).

Melt index was determined by ASTM D1238, Condition E, measured at 190° C. and reported as grams per 10 minutes.

TABLE 2

| | Tensile Strength (in psi) | | Puncture Toughness | |
|---|---|---|---|---|
| Example | MD | TD | Load (lbs) | Energy (in./lbs) |
| 1 | 3944 | 3243 | 7.6 | 11.1 |
| 2 | 3230 | 3096 | 9.0 | 16.8 |
| 3 | 3595 | 3020 | 8.5 | 14.6 |
| 4 | 3805 | 3314 | 8.6 | 15.6 |
| 5 | 3980 | 3292 | 8.8 | 15.0 |
| 6 | 3496 | 3216 | 7.7 | 12.6 |
| 7 | 3389 | 3056 | 8.0 | 12.4 |
| 8 | 3082 | 2892 | 8.6 | 14.6 |
| 9 | 3473 | 3243 | 8.5 | 13.8 |
| 10 | 3510 | 3417 | 8.4 | 14.4 |
| 11 | 3836 | 3366 | 8.6 | 15.0 |

MD means machine direction.
TD means transverse direction.

It is also to be noted that the multilayer film compositions of this invention may contain conventional pigments, anti-oxidants, slip agents and anti-block agents as well as small amounts, for example, up to about 5 percent by weight, of a resin component present as the vehicle or carrier for the aforementioned materials as may be provided from a masterbatch thereof.

Although preferred embodiments of this invention have been described in detail, it is contemplated that modifications thereof may be made and that some features may be employed without others, all within the spirit and scope of the invention. For example, although the films described in the foregoing examples were prepared by blown film extrusion, other preparative methods may be used as, for example, slot cast extrusion.

I claim:

1. A multilayer film consisting essentially of a first outer layer of a blend of a low pressure, low density polyethylene having a melt index of about 1 decigram per minute and a low pressure, low density polyethylene having a melt index of about 2 decigrams per minute, said polyethylene having a melt index of about 1 decigram per minute being present in an amount of from about 40 to about 80 percent by weight of said first outer layer, said polyethylene having a melt index of about 2 decigrams per minute being present in an amount of from about 20 to about 60 percent by weight of said first outer layer, and a second layer comprising a high pressure, low density polyethylene containing up to about 30 percent by weight of a low pressure, low density polyethylene, based on the weight of said second outer layer.

2. A multilayer film as in claim 1 wherein said low pressure, low density polyethylene comprises a copolymer formed from ethylene and a comonomer selected from the group consisting of butene-1, pentene-1, hexene-1, heptene-1 and octene-1, and mixtures thereof.

3. A multilayer film as in claim 1 wherein said first outer layer contains about 80 percent by weight of said low pressure, low density polyethylene having a melt index of about 1 decigram per minute, and about 20 percent by weight of said low pressure, low density polyethylene having a melt index of about 2 decigrams per minute.

4. A multilayer film as in claim 1 wherein said first outer layer contains about 60 percent by weight of said low pressure, low density polyethylene having a melt index of about 1 decigram per minute, and about 40 percent by weight of said low pressure, low density polyethylene having a melt index of about 2 decigrams per minute.

5. A multilayer film as in claim 1 wherein said first outer layer contains about 40 percent by weight of said low pressure, low density polyethylene having a melt index of about 1 decigram per minute, and about 60 percent by weight of said low pressure, low density polyethylene having a melt index of about 2 decigrams per minute.

6. A multilayer film as in claim 1 wherein said low pressure, low density polyethylene has a density of between about 0.916 and about 0.930 grams per cubic centimeter.

7. A multilayer film as in claim 1 wherein said high pressure, low density polyethylene has a melt index of between about 0.5 and about 5.0 decigrams per minute and a density of between about 0.916 and about 0.930 grams per cubic centimeter.

8. A multilayer film as in claim 1 wherein the thickness ratio of said first outer layer to said second outer layer is between about 2:1 and about 1:1.

9. A multilayer film consisting essentially of a first outer layer of a blend of a low pressure, low density polyethylene having a melt index of about 1 decigram per minute and a low pressure, low density polyethylene having a melt index of about 2 decigrams per minute, said polyethylene having a melt index of about 1 decigram per minute being present in an amount of from about 40 to about 80 percent by weight of said first outer layer, said polyethylene having a melt index of about 2 decigrams per minute being present in an amount of from about 20 to about 60 percent by weight of said first outer layer, one or more core layers wherein at least one core layer comprises a low pressure, low density polyethylene, and a second outer layer comprising a high pressure, low density polyethylene containing up to about 30 percent by weight of a low pressure, low density polyethylene, based on the weight of said second outer layer.

10. A multilayer film consisting essentially of a first outer layer of a blend of a low pressure, low density polyethylene having a melt index of about 1 decigram per minute and a low pressure, low density polyethylene having a melt index of about 2 decigrams per minute, said polyethylene having a melt index of about 1 decigram per minute being present in an amount of from about 40 to about 80 percent by weight of said first outer layer, said polyethylene having a melt index of about 2 decigrams per minute being present in an amount of from about 20 to about 60 percent by weight of said first outer layer, one or more core layers wherein at least one core layer comprises a blend of low pressure, low density polyethylene having a melt index of about 1 decigram per minute and a low pressure, low density polyethylene having a melt index of about 2 decigrams per minute, and a second outer layer comprising a high pressure, low density polyethylene containing up to about 30 percent by weight of a low pressure, low density polyethylene, based on the weight of said second outer layer.

11. A method of preparing a multilayer film comprising coextruding a first outer layer of a blend of a low pressure, low density polyethylene having a melt index of about 1 decigram per minute, and a low pressure, low density polyethylene having a melt index of about 2 decigrams per minute, said polyethylene having a melt index of about 1 decigram per minute being present in an amount of from about 40 to about 80 percent by weight of said first outer layer, said polyethylene having a melt index of about 2 decigrams per minute being present in an amount of from about 20 to about 60 percent by weight of said first outer layer, and a second outer layer comprising a high pressure, low density polyethylene containing up to about 30 percent by weight of a low pressure, low density polyethylene, based on the weight of said second outer layer.

12. A method of preparing a multilayer film comprising coextruding a first outer layer consisting essentially of a blend of a low pressure, low density polyethylene having a melt index of about 1 decigram per minute and a low pressure, low density polyethylene having a melt index of about 2 decigrams per minute, said polyethylene having a melt index of about 1 decigram per minute being preset in an amount of from about 40 to about 80 percent by weight of said first outer layer, said polyethylene having a melt index of about 2 decigrams per minute being present in an amount of from about 20 to about 60 percent by weight of said first outer layer, one or more core layers wherein at least one core layer comprises a low pressure, low density polyethylene, and a second layer comprising a high pressure, low density polyethylene containing up to about 30 percent by weight of a low pressure, low density polyethylene, based on the weight of said second outer layer.

13. A method of preparing a multilayer film comprising coextruding a first outer layer consisting essentially of a blend of a low pressure, low density polyethylene having a melt index of about 1 decigram per minute and a low pressure, low density polyethylene having a melt index of about 2 decigrams per minute, said polyethylene having a melt index of about 1 decigram per minute being present in an amount of from about 40 to about 80 percent by weight of said first outer layer, said polyethylene having a melt index of about 2 decigrams per minute being present in an amount of from about 20 to about 60 percent by weight of said first outer layer, one or more core layers wherein at least one core layer comprises a blend of a low pressure, low density polyethylene having a melt index of about 1 decigram per minute and a low pressure, low density polyethylene having a melt index of about 2 decigrams per minute, and a second outer layer comprising a high pressure, low density polyethylene containing up to about 30 percent by weight of a low pressure, low density polyethylene, based on the weight of said second outer layer.

* * * * *